G. H. PETERSON.
LARDING NEEDLE.
APPLICATION FILED DEC. 26, 1913.
1,100,907.
Patented June 23, 1914.
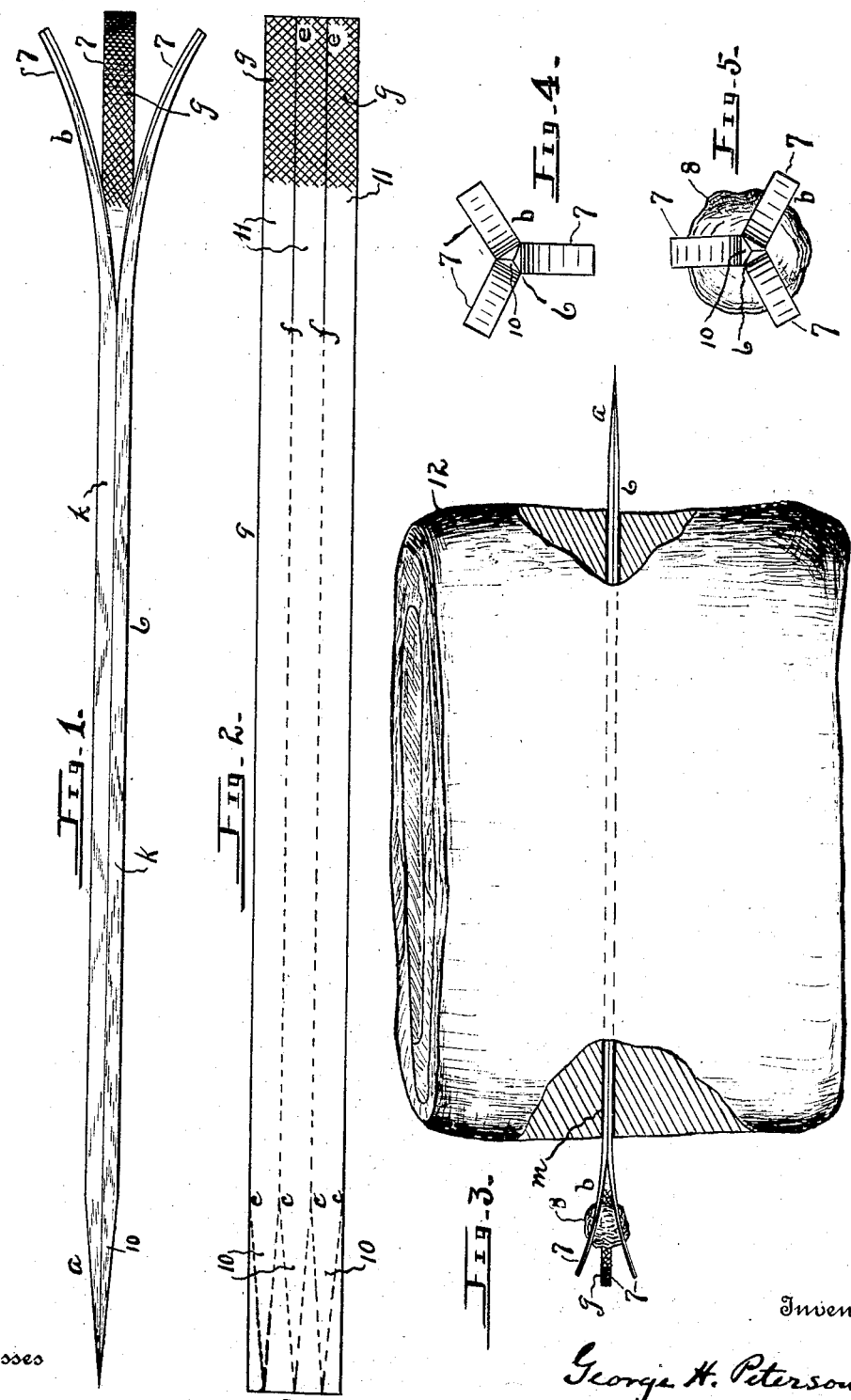
Witnesses
D. Busse.
C. E. Clark.
Inventor
George H. Peterson,
By Hiram A. Sturges,
Attorney

UNITED STATES PATENT OFFICE.

GEORGE H. PETERSON, OF OMAHA, NEBRASKA.

LARDING-NEEDLE.

1,100,907.   Specification of Letters Patent.   Patented June 23, 1914.

Application filed December 26, 1913. Serial No. 808,669.

*To all whom it may concern:*

Be it known that I, GEORGE H. PETERSON, a citizen of the United States, residing at Omaha, in the county of Douglas and State of Nebraska, have invented certain new and useful Improvements in Larding-Needles, of which the following is a specification.

This invention relates to an improvement in larding needles, useful for the purpose of improving roasts or the like where the meat is too firm or lean, by depositing strips of bacon, salt pork or other seasoning material therein before it is baked or roasted, and has for its principal object to provide such a construction that manufacture will be economical and convenient.

Another object is to provide a gripping device so constructed that it will be convenient in use for conducting and depositing the seasoning material when the needle is passed through the meat.

Still another object is to provide a needle of this class which will have such form that it may be moved through the meat by minimum force, and will have a gripping device of such form that it may be quickly loaded and will readily release the material during the movement of the needle.

With these and other objects in view, the invention consists of the novel construction, combination and arrangement of parts as described herein and claimed, and as illustrated in the drawing, wherein—

Figure 1 is a side view of a larding needle embodying my invention. Fig. 2 is a diagrammatic view illustrating a plan for constructing the device from a metallic, rectangular sheet or plate. Fig. 3 is a view, partly in section, showing a meat roast traversed by the device. Fig. 4 is a front end view of the parts shown in Fig. 1. Fig. 5 is a similar view to that shown in Fig. 4, a quantity of seasoning material being added.

Referring now to the drawing for a more particular description, the elongated body 6 of the device is preferably triangular in cross-section, one of its terminals $a$ being tapered to form a sharp point to facilitate the passage of the device through a piece of meat or other substance to be seasoned, the opposite end $b$ of the body 6 being provided with outwardly curved prongs 7. Since these prongs are constructed of elastic material, they may be readily collapsed or disposed parallel with the body 6 by any force which will move them from their normally curved position. While the prongs are disposed in their normal position, any seasoning material 8, such as tallow, lard, butter, pieces of bacon or the like may be placed between said prongs, and when the needle is moved forwardly to pass through the meat 12, the seasoning material will be compressed between the prongs and will be carried within the incision or aperture $m$ formed by the needle and will be deposited in the meat.

The larding needle may be economically constructed by use of an attenuated, rectangular, metallic plate 9 incised adjacent to one of its ends on the broken, inclined lines $c$ $d$ to provide outwardly convergent portions 10, its opposite end being incised on lines $e$ $f$ opening outwardly upon the end and parallel with its side edges to provide wing-members 11, said plate being bent transversely on the broken lines $c$ $f$, to provide longitudinal facets $h$ for the body 6 of the needle, the outwardly convergent portions 10 being disposed with their edges in contact, and each of the wing-members being curved outwardly of the plane of a longitudinal facet to provide the prongs 7 normally having the outward curvature mentioned.

At $g$ is indicated a rugose or milled surface tending to prevent the seasoning material from sliding outwardly of the prongs while said prongs are entering the meat.

Since the needle is triangular in cross-section it may be passed through a roast with a minimum force. During the movement of the needle therethrough, the seasoning substance will be engaged by the prongs and will be carried forwardly within the aperture formed by the needle, but will thereafter become dislodged from the prongs while within said aperture on account of its engagement or contact with the walls of the aperture.

If the pieces of salt pork, bacon or other seasoning material are comparatively large, there may be some difficulty in causing them to enter the aperture formed by the needle, and in such instances, the parts being in the relative positions shown in Fig. 3, the operator may manually compress the terminals of the prongs outwardly of the part 8, as by use of thumb and fingers while the needle is moving forwardly until the prongs have passed inwardly of the aperture.

While I have shown and described rugose surfaces $g$ for the inner sides of the prongs, I do not wish to limit myself to this feature, since the device would be operative for conducting certain kinds of seasoning material without such surfaces. While the rugose surfaces tend to cause the seasoning material to remain in engagement with the prongs, it will become disengaged therefrom during the forward movement of the device.

Having fully described my invention, what I claim and desire to secure by Letters Patent is,—

1. A larding needle consisting of an elongated body having a tapered terminal, its opposite end being formed with outwardly curved elastic prongs with rugose surfaces.

2. A larding needle consisting of a rectangular plate incised at one of its ends to provide outwardly convergent portions, its opposite end being incised on lines opening outwardly, parallel with its side edges to provide prongs, said plate being bent transversely to provide longitudinal facets, the convergent portions being disposed with their side edges in contact, each of said prongs being curved outwardly of the plane of a longitudinal facet.

In testimony whereof I have affixed my signature in presence of two witnesses.

GEORGE H. PETERSON.

Witnesses:
HIRAM A. STURGES,
L. M. THOMAS.

Copies of this patent may be obtained for five cents each, by addressing the "Commissioner of Patents, Washington, D. C."